United States Patent [19]
Bayha et al.

[11] 3,805,161
[45] Apr. 16, 1974

[54] APPARATUS FOR SENSING SPEED

[75] Inventors: Wulf Bayha; Walter Grozinger, both of Hofingen, Germany

[73] Assignee: Moto Meter GmbH, Leonberg/Wurtt., Germany

[22] Filed: July 12, 1972

[21] Appl. No.: 271,158

[30] Foreign Application Priority Data
July 17, 1971 Germany.......................... 2135912

[52] U.S. Cl...................... 324/161, 324/174, 317/5, 73/519
[51] Int. Cl. ............................................. G01p 3/56
[58] Field of Search .......... 324/161, 173, 174, 166; 73/518–520, 493; 317/5

[56] References Cited
UNITED STATES PATENTS

| | | | |
|---|---|---|---|
| 3,505,879 | 4/1970 | Vanderberg | 324/174 |
| 3,573,619 | 4/1971 | Ivec | 324/174 |
| 3,548,663 | 12/1970 | Radin | 73/519 |
| 3,560,854 | 2/1971 | Moss | 324/161 |
| 3,704,445 | 12/1972 | Lanham | 324/161 |

Primary Examiner—Michael J. Lynch
Attorney, Agent, or Firm—Spencer & Kaye

[57] ABSTRACT

An apparatus for sensing speed levels of a motor vehicle includes a rotatable magnet, preferably in the shape of a disc. A speedometer drive is arranged to rotate the magnet at an angular velocity related directly to the speed of the vehicle. A coil is positioned in the vicinity of the magnet and is operatively responsive to its magnetic field and thus produces an alternating voltage signal having a frequency related to the speed of the vehicle. A signal processing circuit is coupled to the coil and produces an output signal indicative of the speed of the vehicle in response to the alternating voltage signal received from the coil. The rotatable magnet and the speedometer drive may be parts of a conventional eddy current speedometer.

2 Claims, 3 Drawing Figures

APPARATUS FOR SENSING SPEED

BACKGROUND OF THE INVENTION

This invention relates to an apparatus for sensing speed levels of vehicles. The present invention relates, more particularly, to an apparatus for sensing speed levels of vehicles provided with eddy current speedometers.

It is known to sense the instantaneous speed of a motor vehicle as accurately as possible, to produce an information signal indicative of the sensed speed and to feed the information signal to a processing circuit and/or other devices which respond to the information signal and provide, as outputs, certain switching signals and/or measures. The sensing of the speed of an automobile for measuring purposes and producing signals indicative of sensed speed which can be further processed are possible, for example, in conjunction with a conventional speedometer which is indicating the speed of the vehicle, signals indicative of speed being derived from the indicator shaft of the speedometer. This may be accomplished, for example, by connecting an opaque radially extendable body or flag to the indicator shaft. As the indicator shaft rotates, the opaque body or flag enters into the path of a light beam whenever a given speed level is reached so that the light beam is interrupted, thus providing an output signal. It is also possible to provide an apparatus for sensing speed which includes a so-called make-and-break oscillator and a radially extendable body or flag connected to the indicator shaft, the radially extendable body or flag being operatively arranged to move into the resonant coil of the oscillator whenever a given speed level is reached. A further example for sensing the speed of a motor vehicle is a conventional mechanically acting centrifugal pendulum.

All of the known arrangements have a substantial drawback; such apparatus, which produce a signal from the movement of a speedometer indicator shaft, only produce a single information signal and thus provide a single switching point. Furthermore, these known apparatus also exhibit a strong undesirable hysteresis characteristic. The obtainable accuracy possible using these known apparatus, in each case, is low as a result of the error inherent in the speedometer, which even with very high quality instruments can be corrected only approximately, is fully incorporated into the measuring result. Such arrangements thus cannot be used effectively for producing accurate signals with high precision and for different speed levels which are to be sensed for possibly quite independent reasons. For example, it could be desirable to provide a lamp which lights whenever a speed level corresponding, for example, to a speed limit of 30 miles per hour or the like as prescribed within many cities or towns, is reached, the usual speedometer lead being eliminated. It also seems desirable to be able to produce signals at certain other speed levels and/or to initiate automatically switching measures desired at these other speed levels. Thus it could further be conceivable to cut off the ignition whenever a certain given maximum speed level has been reached which corresponds to a maximum limit of revolutions or at least to initiate automatically a blockage of the fuel intake.

A further very desirable possibility would be if the driver of the motor vehicle would have the opportunity, by twisting a knob, to set a certain vehicle speed level, for example when he desires to drive no more than a certain speed or when there is a general speed limit for extended distances. If this speed limit is reached or exceeded, respectively, a signal could be produced, previously determined functions and operations at other speed levels not being thereby influenced.

It is understood that such signals must be given with the utmost precision so that, for example, for certain uniform speed regulations a uniformity of traffic flow and thus increased traffic safety can be assured inasmuch as the widely differing measuring results, as they are often noted on the roads at speeds in a range about 30 miles per hour due to the variations in speedometer accuracies are reduced. In this way the danger of repeated mutual passing of automobiles could be reduced.

SUMMARY OF THE INVENTION

An object of the present invention is to provide an apparatus for sensing speed levels of motor vehicles having a speedometer, which apparatus operates with high precision.

An additional object of the present invention is to provide an apparatus for sensing speed levels of motor vehicles which is able to process a plurality, preferably any desired number, of sensed speed levels into respective output signals and to display them separately.

A further object of the present invention is to provide an apparatus for sensing speed levels of motor vehicles which can be installed in virtually any motor vehicle with little additional expense, no tampering with the engine, the gear assembly or other drive assemblies being necessary.

The foregoing objects, as well as others which are to be made clear from the following text, are accomplished in accordance with the present invention by providing an apparatus for sensing speed of a motor vehicle with a rotatable magnet. A speedometer drive is coupled to the magnet for rotating the magnet at an angular velocity related to the speed of the vehicle. A coil is positioned in the vicinity of the magnet and responds to the magnetic field of the magnet for producing an alternating voltage signal having a frequency related to the speed of the vehicle. A signal processing circuit is coupled to the coil and produces an output signal indicative of the speed of the vehicle in response to the alternating voltage signal from the coil.

In operation, the rotating generator magnet of the speedometer is driven via the speedometer shaft. A receiver coil is disposed in the vicinity of the rotating magnet. As a result of the magnetic field produced by the rotating magnet acting on the receiver coil, an alternating output voltage is produced which is fed from the receiver coil to a processing circuit. The zero passages or frequency of the alternating voltage produced in the receiver coil are a measure for the speed of the vehicle.

Since it can be assumed that the speedometer shaft moves in absolute proportionality to the rotation of the rear axle, it is assured that the measuring results do not include measuring errors inherent in the system and in conventional speedometers. According to the present invention, the revolutions of the speedometer shaft may be utilized in a digital manner due to the field developed by the rotating generator magnet of the speedometer. Inaccuracies and errors known to exist in conventional spring restrained speedometers, in which eddy currents induced by an aluminum disc produce a speed indication signal, are avoided.

According to a further embodiment of the present invention, the receiver coil is positioned about a short-circuit ring made of magnetizable material enclosing the rotating generator magnet, the ring providing a magnetic short circuit. No modifications to the speedometer itself are required. The apparatus of the present invention does not interfere with the operation of the speedometer itself.

A further substantial advantage of the present invention is that the accuracy of the speed indication is not altered in any way by aging; even when the conventional speedometer indication becomes more and more inaccurate, the signal production at the given speed levels is effected with unchanging precision at the intended speed levels since aging of the magnet and displacement of the components with respect to one another, as well as temperature influences, can exert no influence whatsoever on the frequency or zero passages of the output voltage signals produced in the receiver coil.

DESCRIPTION OF THE PREFERRED EMBODIMENTS

Figure 1:
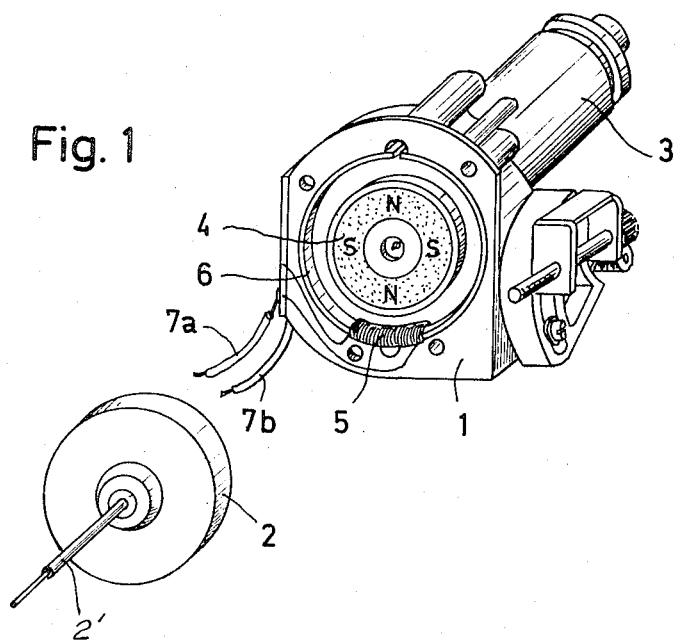
FIG. 1 is an exploded perspective view of the lower portion of an automobile speedometer modified in accordance with the present invention.
Figure 2:
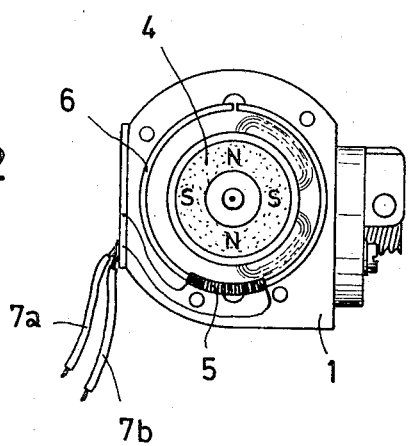
FIG. 2 is a top view of the lower portion of the speedometer shown in FIG. 1.

Referring to FIGS. 1 and 2, a modified, commercially available speedometer for a motor vehicle, as illustrated, includes a conventional housing 1, a conventional rotatable generator magnet 4 and a conventional aluminum disc 2 in the form of a hood which covers the magnet 4, the aluminum disc 2 being shown detached for purposes of clarity. The conventional upper portion of the speedometer with its indicating scale has not been shown in FIGS. 1 and 2 and is not required for the further explanation.

A lower portion 3 of the housing 1 holds a conventional speedometer shaft (not visible) whose revolution effects directly a rotation of a generator magnet 4, i.e., the magnet 4 which is a permanent magnet rotates at a speed which is directly proportional to the speed of the vehicle and constitutes a highly accurate representation of this vehicle speed. Measuring errors cannot occur at this stage. The permanent magnet 4 which is provided in the form of a rotatable disc has two north and two south poles. The magnet 4 is covered by the hood-shaped disc 2 preferably made of aluminum. Upon rotation, the magnetic field of the permanent magnet 4 induces eddy currents in the aluminum disc 2 which cause the aluminum disc 2 to follow in the direction of rotation of the magnetic field. As known, the aluminum disc 2 is restrained by the spring force of a helical spring (not visible) connected to its shaft 2' so that its maximum possible angle of rotation, which is substantially proportional to the speed of rotation of the permanent magnet 4, constitutes a measure for the speed of the vehicle. As already mentioned above, however, the thus obtained speed indication is not very precise, and may be subject in its accuracy to temperature fluctuations and aging so that a derivation of measured values from the angle of rotation of the aluminum disc 2 becomes faulty.

Figure 3:
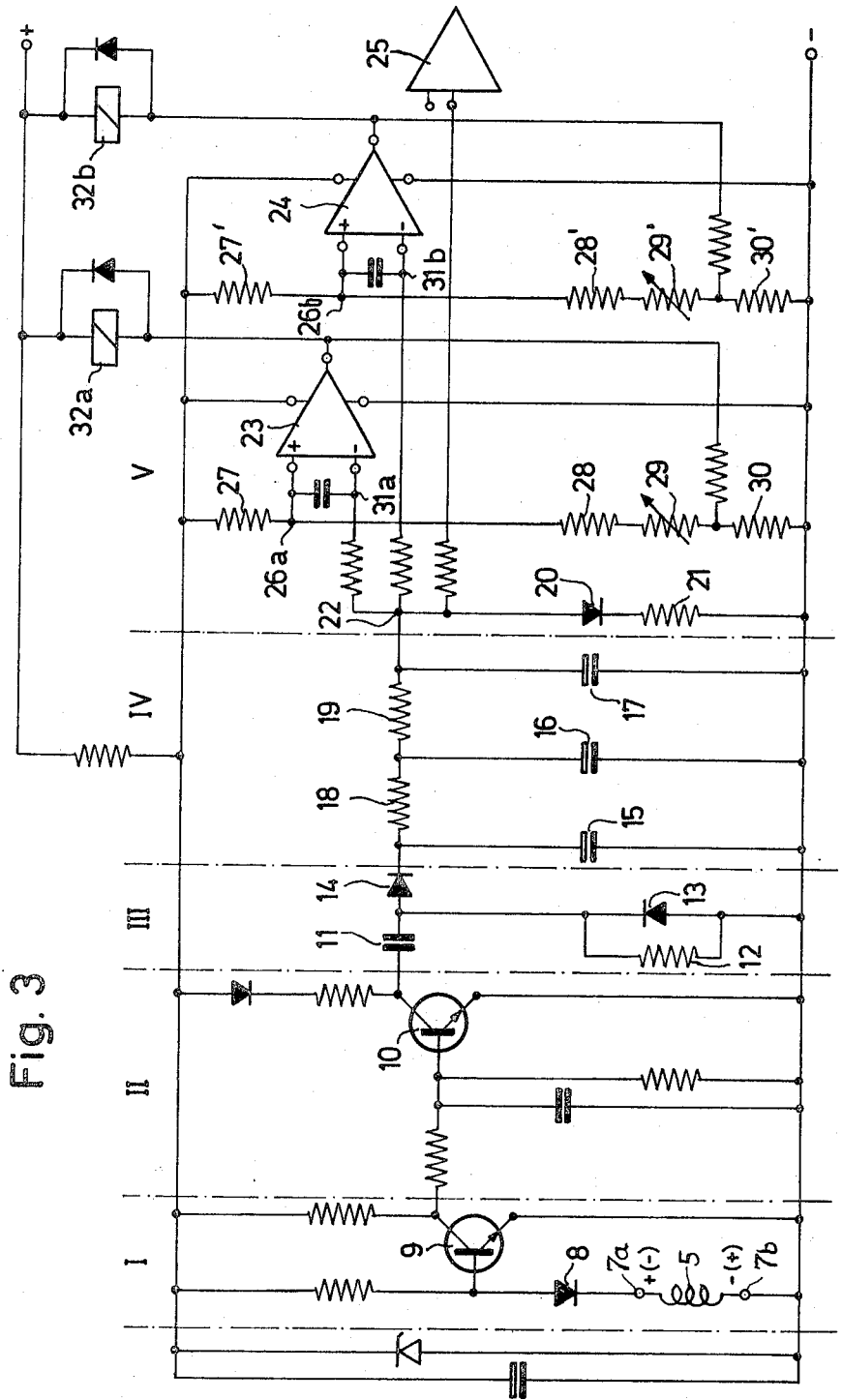
FIG. 3 is a schematic diagram of a signal processing circuit for evaluating signals produced by the apparatus shown in FIGS. 1 and 2.

According to the present invention, a receiver coil 5 is disposed in the vicinity of the permanent magnet 4 driven by the speedometer shaft. The coil 5 only need be operatively positioned in such a way that it is periodically intersected by the magnetic field originating from the rotating permanent magnet 4. According to a preferred embodiment of the present invention, the coil 5 is wound about a short-circuit ring 6 made of a magnetic material as a single or multiple layer winding. The short-circuit ring 6 provides a low reluctance path for the flux emanating from the disc-shaped permanent magnet 4, as illustrated in FIG. 2. In this manner it is assured that the coil 5 is always intersected by the magnetic flux and an induced output voltage signal is produced in the coil 5 upon rotation of the permanent magnet 4, the output voltage signal being fed to the signal processing circuit shown in FIG. 3.

It can be seen that a weakening or fluctuation of the magnetic field produced by the permanent magnet 4 or other changes in the structural components of the speedometer drive can affect the output voltage signal produced in the coil 5 as far as the amplitude of this voltage signal is concerned, but the zero passages or frequency of this voltage signal precisely depend on the rotation of the permanent magnet 4 and are only a measure of this rotation. Advisably, the construction of a conventional speedometer is modified in accordance with the present invention by positioning the receiver coil 5 about the magnetic short-circuit ring 6, which usually encloses the permanent magnet 4 required to drive the speedometer indicator, during manufacture, in such a manner that the coil 5 is intersected by the lines of force of the permanent magnet 4. Electrical connections to the ends of the coil 5 are provided by a pair of output terminals or leads 7a and 7b which can be attached to the ends of the coil 5 during assembly or may be constituted by extensions of the wire forming the coil 5. The leads 7a and 7b are brought out from the housing 1 via a suitably arranged aperture. A change in the speedometer characteristic per se does not result from the installation of the additional coil 5 and it is not necessary to change the original dimensions of the speedometer since the coil can be kept sufficiently small.

The signal to be obtained at the output terminals or leads 7a and 7b from the coil 5 is an approximate sine oscillation in the illustrated embodiment. This signal is fed to the evaluation circuit shown in FIG. 3 for further processing. The receiver coil 5 (FIGS. 1 and 2) corresponds to the coil 5 shown in FIG. 3. Depending on the instantaneous polarity of the voltage produced in the coil 5 and applied to a diode 8 connected in series with the coil 5, the diode 8 becomes respectively conductive or blocks so that voltage variations appear at the base terminal of a transistor 9 which voltage variations are amplified by the transistor 9 and appear as amplified pulses at its collector. These amplified pulses are fed to a subsequently connected transistor amplifier 10. The first transistor 9 acts as a pulse preamplifier and comprises stage I of the signal processing circuit. Stage II is formed by the transistor amplifier 10 which operates somewhat in the manner of a simplified monostable multivibrator. The pulses produced at its collector are differentiated by the RC network 11 and 12 of a subsequent stage III and the resulting negative going spike pulses are simultaneously conducted to ground via a diode 13. The positive going spike pulses travel via a diode 14 to a charging and smoothing filter which includes capacitors 15, 16, and 17, and resistors 18 and 19 which constitute stage IV of the processing circuit. The capacitors 15, 16, and 17 whose one terminal is connected to ground, shown as negative, and whose other terminals are connected to the respective connecting points of the series circuit formed by the two resistors 18 and 19, have capacitance values from about 1 $\mu$f to about 10 $\mu$f, so that the capacitors can charge to a certain positive charge level in dependence on the speed of rotation of the permanent magnet 4 (FIGS. 1 and 2) and thus in dependence on the number of incoming pulses supplied from the transistor amplifier 10. The stage IV acts as an integrator. In a subsequent stage V a resistor 21 provides a continuous discharging path for the integrating filter formed by the stage IV. A diode 20 is connected in series with the resistor 21 and the capacitor 17 and serves to improve the temperature characteristic of the processing circuit. A positive voltage is produced at a point 22 of the circuit which is precisely dependent on the speed of the driven vehicle, i.e. on the number of pulses produced by the transistor amplifier 10. Thus, a transition from digital to analog evaluation takes place between the stages III and IV, the digital signals arriving as positive going voltage spikes and being summed in the smoothing filter of stage IV operating as a summing or integrating member. The voltage level at the point 22 can be determined via subsequently connected measuring arrangements. Respective signal inputs of integrated Schmitt trigger circuits 23, 24 and, if desired, additional Schmitt trigger circuits such as a circuit 25 are each coupled to the point 22. Schmitt trigger circuits are employed since thus it is possible to set a very low hysteresis. The integrated components acting respectively as each of the Schmitt trigger circuits 23, 24, and 25 have two inputs. The potential of one input 26a of the Schmitt trigger circuit 23 and one input 26b of the Schmitt trigger circuit 24 are precisely set and given by respective voltage divider circuits formed respectively by resistors 27, 28, 29, and 30 and resistors 27', 28', 29', and 30'. It is to be understood that one input of each additional Schmitt trigger circuit, such as the circuit 25, is to be connected to similar voltage dividers.

Depending on the voltage level of the other input 31a or 31b (i.e. point 22 of the circuit) of the respective Schmitt trigger circuits 23 and 24, it switches from one state to its other state, i.e. at a more positive potential at 31a or 31b compared respectively to inputs 26a or 26b, the corresponding Schmitt trigger circuit 23 or 24, respectively, flips to its other state and thus applies full voltage to a subsequently connected relay 32a or 32b, respectively, so that the associated relay is energized and, in turn, enables further circuits (not shown) to produce signals or itself effects the necessary switchings such as the lighting of a signalling light or the sounding of an alarm. The relays 32a and 32b are connected, respectively, in parallel with diodes in a known manner to limit the cut-off voltage. Since the inputs of the integrated Schmitt trigger circuits 23, 24, 25, etc. practically place no load on point 22 of the circuit, it is possible to use any desired number of subsequently connected Schmitt trigger circuits or other similar circuit arrangements which can be set to any desired voltage by the appropriate setting of the resistors 29 or 29', which are preferably variable as shown, or similar resistors in the voltage divider circuits. Thus any desired speed level indicating or switching circuits can be provided and be made independently and individually settable. It is possible, for example, to switch the Schmitt trigger circuit 23 at the speed of 30 miles per hour, the circuit being able to react with such sensitivity that the switching takes place precisely at the given speed and a signal is produced from the Schmitt trigger circuit 23. At a speed of 60 miles per hour other switching measures may be taken in response to an output from the Schmitt trigger circuit 24 and it is particularly possible in this manner to meet legal requirements, such as, for example, the actuation of certain signalling devices which may be prescribed at certain speeds. Thus the substantially digital generation and processing of a speed proportional signal always assures accurate speed indication.

It is further conceivable that, for example, instead of the variable resistor 29 for biasing the first Schmitt trigger circuit 23, a specially calibrated potentiometer may be employed which can be set, for example, via a button accessible from the dashboard, on a scale calibrated in miles per hour. Then it is possible for every driver to set a given speed according to his desire by electronic means at which, for example, a lamp will light up. Such a signal can also be used, in a further embodiment of the present invention, to actuate the accelerator and/or the brake of a vehicle. If a further one of the Schmitt trigger circuits is also made variable, then it is possible to set a certain speed interval which is to be maintained, where the circuits can be set in such a way that a certain lamp lights up when the set speed interval is being maintained. This contributes to uniform traffic flow.

It will be understood that the above description of the present invention is susceptible to various modifications, changes and adaptations and the same are intended to be comprehended within the meaning and range of equivalents of the appended claims.

I claim:

1. An apparatus for sensing speed levels of a motor vehicle having an eddy current speedometer which includes rotatable magnet means driven by a speedometer drive means, the apparatus comprising coil means positioned in the vicinity of said magnet means and responsive to its magnetic field for producing an alternating voltage signal having a frequency related to the speed of the vehicle, and signal processing circuit means coupled to said coil means and responsive to the alternating voltage signal for producing an output signal indicative of the speed of the vehicle, said signal processing circuit means including:

a. pulse-forming amplifier means coupled to said coil means and responsive to the alternating voltage signal for producing pulses;

b. further amplifier means having its input coupled to said pulse-forming amplifier means and responsive to the pulses therefrom;

c. differentiating means coupled to said further amplifier means and responsive to its pulse output for producing spike pulses of given polarity;

d. integrating filter means coupled to said differentiating means and responsive to the spike pulses of given polarity for producing the direct voltage output signal indicative of the speed of the vehicle, said integrating means having first resistive means, capacitive means and second resistive means for constantly discharging said capacitive means, wherein the voltage state of said integrating means is a measure of the repetition rate of the pulses of given polarity and thus the speed of the vehicle;

e. at least one bias voltage supply means having a respective voltage divider means having at least two series connected resistors, wherein one of said two series connected resistors in said voltage divider is adjustable and is calibrated in units of distance per time period and is operatively arranged to be selectively adjusted from the dashboard of the vehicle;

f. at least one Schmitt trigger circuit, each said Schmitt trigger circuit having its signal input terminal coupled to said integrating means and being responsive to the voltage state of said integrating means and said Schmitt trigger circuit having its respective bias input terminal coupled to a respective said bias voltage supply means; and g. relay means coupled to a respective said Schmitt trigger circuit and responsive to the state thereof.

2. An apparatus as defined in claim 1 wherein said magnet means comprises a disc-shaped permanent magnet and the apparatus further comprises a magnetic short-circuit ring positioned about the periphery of said disc-shaped permanent magnet, said coil means being disposed about said ring.

* * * * *